United States Patent Office 2,914,537
Patented Nov. 24, 1959

2,914,537
SOLVENT SOLUBLE PHTHALOCYANINE DYES

David I. Randall, New Vernon, and Anatole Wowk, Rahway, N.J., assignors to General Aniline & Film Corporation, New York, N.Y., a corporation of Delaware No Drawing. Application January 24, 1957
Serial No. 635,956

8 Claims. (Cl. 260—314.5)

This invention relates to solvent soluble phthalocyanine dyes, and relates more particularly to a novel process for the preparation of solvent soluble blue-green to blue phthalocyanine dyes having desirable fastness characteristics.

As is well known, valuable phthalocyanine compounds are obtained by treating metal phthalocyanines with oxidizing agents to produce intermediate, reversible oxidation products. These oxidation products are suitable for use in the coloring of textile materials by a process which comprises the impregnating of the textile material with a solution of the oxidation product in an organic solvent, and then treating the impregnated textile material with reducing agents or with heat to regenerate the color. Thus, the coloring of textile materials with phthalocyanine dyes is similar to the coloring of textile materials with vat dyes with the difference that vat dyes are first reduced to make them soluble, while phthalocyanine dyes are first oxidized to make them soluble. Moreover, in the case of vat dyes oxidation is resorted to to regenerate the color, while with phthalocyanine dyes a reducing operation is required to regenerate the color. It will be seen that the dyeing with phthalocyanine dyes is analogous to the dyeing with vat dyes. Accordingly, the oxidation products of the phthalocyanine dyes are known in the art as leuco phthalocyanines.

We have now discovered an improved process for the treatment of phthalocyanines whereby valuable solvent soluble dyes are obtained. In accordance with the process of our invention, a metal phthalocyanine, such as copper phthalocyanine, cobalt phthalocyanine, chromium phthalocyanine, nickel phthalocyanine and iron phthalocyanine, is reacted with any suitable aryl sulfondihaloamide oxidizing agent such as, for example, Dichloramine T, $CH_3C_6H_4SO_2NCl_2$ or its bromine analogue. Preferably, the reaction is effected in an organic liquid which is a solvent for the oxidation products formed, i.e. the leuco metal phthalocyanines, at temperatures of from 20 to 30° C. The solvent liquids employed may be, for example, methanol, ethanol, monoethyl ether of ethylene glycol (Cellosolve) monomethyl ether of ethylene glycol (methyl Cellosolve), diethylene glycol ethyl ether (Carbitol), benzene and chloroform.

More specifically, the valuable solvent soluble dyes may be obtained by reacting 1 mole of a metal phthalocyanine to 0.95 to 1.10 moles of the aryl sulfondihaloamide for from 4 to 48 hours, preferably 4 to 5 hours, at temperatures of from 20 to 30° C., the reaction being effected in from 630 to 850 parts of one of the above-mentioned solvent liquids per 100 parts of the metal phthalocyanine employed.

At the completion of the oxidation operation, the unreacted pigment, if any, is filtered off. The filtrate is then diluted with water, the leuco metal phthalocyanine is precipitated, and the precipitate is filtered off.

The leuco metal phthalocyanines prepared in accordance with our process do not have the characteristic reddish-blue to greenish-blue color of the parent metal phthalocyanines, but have a color ranging from yellow green to greenish-brown and brown. To obtain valuable blue-green to blue dyes these leuco metal phthalocyanines are subjected to a color regenerating treatment by the use of heat, i.e. thermal regeneration, or a treatment with reducing agents, i.e. a chemical regeneration. The metal phthalocyanine dyes are highly satisfactory, particularly in connection with the dyeing of cellulosic textile materials, such as cotton, regenerated cellulose and the like, since they produce on such textile materials blue-green to blue shades of superior light fastness and chlorine fastness.

While good results are obtained by padding the leuco metal phthalocyanines on a textile material and then subjecting the treated material to a chemical regeneration with a reducing agent in an aqueous, an alcoholic or an aqueous-alcoholic medium at a temperature of 80 to 100° C., optimum results are obtained by thermal regeneration. In thermal regeneration, the material padded with the leuco metal phthalocyanine dye is dried at a temperature of from 80 to 100° C. in a stream of dry hot air. The thermal regeneration of the leuco metal phthalocyanine dye has the added advantage of being more economical than the chemical regeneration thereof. Examples of reducing agents which may be employed to regenerate the color of the metal phthalocyanines are potassium ferrocyanide, sodium hydrosulfite in acid, neutral or alkaline conditions, ascorbic acid, sodium sulfide, sodium sulfhydrate, sodium thiosulfate, hydrazine hydrate, zinc formaldehyde sulfoxylate, sulfites and bisulfites of sodium and potassium.

The following examples are given for the purpose of illustrating our invention and are not to be considered in any way limitative. The parts are by weight.

*Example I*

50.2 parts of Dichloramine T was dissolved in 720 parts of methanol. To this solution, 115.2 parts of copper phthalocyanine in finely divided form was added. The reaction mixture was stirred at 25° C. for 5 hours. The unreacted pigment was filtered off and the filter cake was washed with 96 parts of methanol. The filtrate and washing were combined and drowned in 9800 parts of water. The drowning mixture was neutralized with ammonium carbonate, stirred overnight. The precipitated leuco compound was filtered off, washed with water, dried in air. 100 parts of olive-green material was obtained. When applied to cotton cloth by method described in Example V, this material gave a bright blue dyeing possessing excellent fastness to light and good fastness to chlorine.

*Example II*

50 parts of finely dispersed copper phthalocyanine was added to 500 parts of chloroform, and 20 parts of Dichloramine T was added over a 5 minute period. The mixture was stirred at room temperature for 48 hours. The unreacted pigment residue was filtered off. The filter cake was washed with 200 parts of hot "Cellosolve" and the filtrate and washing were combined. Chloroform was distilled off using at first an aspirator and then a vacuum pump at about 5 mm. mercury pressure. Distillation residue was poured into 4000 parts of water, stirred 45 minutes, filtered. The filter cake was reslurried in 500 parts of water, stirred 30 minutes and refiltered. The filter cake was dried in a vacuum desiccator. 12 parts of tan colored product was obtained. A sample of this material was dissolved in "Cellosolve" and padded on the cotton cloth. The padding developed a strong green-blue color when treated with a hot aqueous solution of a reducing agent such as potassium ferrocyanide followed by lactic acid treatment, or when dried in a stream of hot air for 30 minutes.

*Example III*

25 parts of semichloro copper phthalocyanine reduced to fine particle size by ballmilling was slurried in 250 parts of methyl "Cellosolve." 11 parts of Dichloramine T was then added and the reaction mixture stirred at 25–30° C. for 48 hours. Unreacted pigment was then filtered off. The filtrate was drowned in 5000 parts of water. There was then added 1% of resulting volume of common salt. The mixture was stirred 30 minutes and filtered. The filter cake was washed with water and dried in air. The product was applied to cotton cloth in the manner described in Example II and yielded a blue-green dyeing.

*Example IV*

12.6 grams of Dichloramine T were dissolved in 200 parts of methanol. Then 28.5 grams of finely divided cobalt phthalocyanine were added. The reaction mixture was stirred at 25° C. for 3 hours, and filtered. The filter cake was washed with 20 parts of methanol. The filtrate and washing were drowned in 2250 parts water. There was then added 2% of volume of common salt, and the mixture was stirred overnight, and filtered. The filter cake was washed with water and dried in air. A brown colored material was obtained which when padded on cotton cloth from carbitol solution imparted to the cloth a green coloration quite stable at ordinary temperatures. This dyeing was developed to a blue color by treating the padded cloth with a neutral sodium hydrosulfite solution.

*Example V*

0.90 part of leuco copper phthalocyanine obtained in Example I was dissolved in 62 parts of carbitol. There were added while stirring 1 part of aminoethylethanolamine, 12.5 parts of triethanolamine, 56 parts of 0.5% Keltex Gum solution and 37 parts of 0.5% Blancol N solution. This mixture was stirred well and diluted to 250 parts with water. Mercerized cotton sheeting cloth was padded in this liquor then dried in a stream of hot air at 90–95° C. for 30 minutes. The dried swatches were then boiled in 0.5% soap solution for 10 minutes, rinsed, dried. Bright blue dyeings of superior fastness properties were obtained.

*Example VI*

150 parts of finely divided copper phthalocyanine was slurried in 390 parts of methanol and 860 parts of methyl "Cellosolve." To the slurry was added 85.5 parts of toluene-p-sulfondibromamide over a period of ten minutes and the mixture was stirred at a temperature of 25° C. for 4 hours. The unreacted pigment was filtered off and the filter cake was washed with 360 parts of methanol. The filtrate and wash liquor were combined and drowned in eight volumes of cold water. The latter mixture was neutralized with dilute ammonia and stirred overnight. The precipitate of leuco compound was filtered off, washed with water, and dried in air. It yielded bright blue dyeings when applied and developed by the procedure described in Example V.

It is to be understood that the foregoing detailed description is given merely by way of illustration and that many variations may be made therein without departing from the spirit of our invention.

Having described our invention, what we desire to secure by Letters Patent is:

1. In a process for oxidizing copper phthalocyanine to its leuco form, the improvement which comprises effecting the oxidation by reacting a phthalocyanine with an aryl sulfondihaloamide selected from the group consisting of toluene sulfondichloramide and toluene sulfondibromamide.

2. In a process for oxidizing copper phthalocyanine to its leuco form, the improvement which comprises effecting the oxidation by reacting a phthalocyanine with an aryl sulfondihaloamide, selected from the group consisting of toluene sulfondichloramide and toluene sulfondibromamide, in a solvent for the leuco phthalocyanine compound formed selected from the group consisting of methanol, ethanol, monoethyl ether of ethylene glycol, monomethyl ether of ethylene glycol, diethylene glycol ethyl ether, benzene and chloroform.

3. Process for the preparation of blue-green to blue dyeings of superior fastness to light and chlorine, which comprises forming a leuco metal phthalocyanine compound by reacting 1 mole of a metal phthalocyanine with from 0.95 to 1.10 moles of an aryl sulfondihaloamide, selected from the group consisting of toluene-p-sulfon dichloroamide and toluene-p-sulfondibromamide, for from 4 to 48 hours at a temperature of from 20 to 30° C. and regenerating the leuco compound by subjecting the same to an elevated temperature of from 80 to 100° C.

4. Process for the preparation of blue-green to blue dyeings of superior fastness to light and chlorine, which comprises forming a leuco metal phthalocyanine compound by reacting 1 mole of a metal phthalocyanine with from 0.95 to 1.10 moles of an aryl sulfondihaloamide, selected from the group consisting of toluene-p-sulfondichloramide and toluene-p-sulfondibromamide, for from 4 to 48 hours at a temperature of from 20 to 30° C. and regenerating the leuco compound by drying the same at a temperature of 80 to 100° C. in a stream of hot dry air.

5. Process for the preparation of blue-green to blue dyeings of superior fastness to light and chlorine, which comprises forming a leuco metal phthalocyanine compound by reacting 1 mole of a metal phthalocyanine with from 0.95 to 1.10 moles of an aryl sulfondihaloamide, selected from the group consisting of toluene-p-sulfondichloramide and toluene-p-sulfondibromamide for from 4 to 48 hours at a temperature of from 20 to 30° C. and regenerating the leuco compound by subjecting the leuco compound at a temperature between 80 and 100° C. to the action of a reducing agent.

6. Process for the preparation of blue-green to blue dyeings of superior fastness to light and chlorine, which comprises forming a leuco metal phthalocyanine compound by reacting 1 mole of a metal phthalocyanine with from 0.95 to 1.10 moles of an aryl sulfondihaloamide, selected from the group consisting of toluene-p-sulfondichloramide and toluene-p-sulfondibromamide, for from 4 to 48 hours at a temperature of from 20 to 30° C. and regenerating the leuco compound by subjecting the leuco compound at a temperature between 80 and 100° C to the action of a reducing agent in a medium selected from the group consisting of aqueous, alcoholic and aqueous-alcoholic media.

7. Process for the preparation of blue-green to blue dyeings of superior fastness to light and chlorine, which comprises forming a leuco metal phthalocyanine compound by reacting 1 mole of copper phthalocyanine with from 0.95 to 1.10 moles of an aryl sulfondihaloamide, selected from the group consisting of toluene-p-sulfondichloramide and toluene-p-sulfondibromamide, for from 4 to 48 hours at a temperature of from 20 to 30° C. and regenerating the leuco compound by drying the same at a temperature of 80 to 100° C. in a stream of hot dry air.

8. Process for the preparation of blue-green to blue dyeings of superior fastness to light and chlorine, which comprises forming a leuco metal phthalocyanine compound by reacting 1 mole of copper phthalocyanine with from 0.95 to 1.10 moles of an aryl sulfondihaloamide, selected from the group consisting of toluene-p-sulfondichloramide and toluene-p-sulfondibromamide, for from 4 to 48 hours at a temperature of from 20 to 30° C. and regenerating the leuco compound by subjecting the leuco compound at a temperature between 80 and 100° C. to the action of a reducing agent in a medium selected from the group consisting of aqueous, alcoholic and aqueous-alcoholic media.

References Cited in the file of this patent

UNITED STATES PATENTS

| | | |
|---|---|---|
| 2,276,175 | Fleysher et al. | Mar. 10, 1942 |
| 2,662,895 | Pedersen | Dec. 15, 1953 |
| 2,662,896 | Pedersen | Dec. 15, 1953 |
| 2,681,347 | Pedersen | June 15, 1954 |
| 2,772,283 | Stevenson | Nov. 27, 1956 |
| 2,782,207 | Perkins et al. | Feb. 19, 1957 |

OTHER REFERENCES

Fieser and Fieser: Nat. Prods. Related to Phenanthine, 3rd ed., page 448, Reinhold Pub. Co., New York (1949).